(12) United States Patent
Molesky et al.

(10) Patent No.: US 10,175,941 B2
(45) Date of Patent: Jan. 8, 2019

(54) AUDIO FEEDBACK FOR CONTINUOUS SCROLLED CONTENT

(71) Applicant: Oracle International Corporation, Redwood Shores, CA (US)

(72) Inventors: Lory Molesky, Lexington, MA (US); Benjamin L. Moroze, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 206 days.

(21) Appl. No.: 15/163,638

(22) Filed: May 24, 2016

(65) Prior Publication Data

US 2017/0344339 A1    Nov. 30, 2017

(51) Int. Cl.
*G06F 17/00* (2006.01)
*G06F 3/16* (2006.01)
*G06F 3/0485* (2013.01)

(52) U.S. Cl.
CPC ............ *G06F 3/167* (2013.01); *G06F 3/0485* (2013.01)

(58) Field of Classification Search
CPC .............................. G06F 3/0485; G06F 3/167
See application file for complete search history.

(56) References Cited

U.S. PATENT DOCUMENTS

| | | | | |
|---|---|---|---|---|
| 6,469,712 B1* | 10/2002 | Hilpert, Jr. | ............... | G06F 3/012 715/727 |
| 6,489,951 B1* | 12/2002 | Wong | .................. | G06F 3/04886 345/173 |
| 8,381,107 B2 | 2/2013 | Rottler | | |
| 8,448,084 B2 | 5/2013 | Brichter | | |
| 9,680,927 B2* | 6/2017 | Knight | ................ | H04L 67/1095 |
| 9,690,377 B2* | 6/2017 | Lee | .......................... | G06F 3/016 |
| 2008/0129520 A1 | 6/2008 | Lee | | |
| 2009/0231271 A1* | 9/2009 | Heubel | .................... | G06F 3/016 345/156 |
| 2010/0169822 A1 | 7/2010 | Hollemans | | |
| 2011/0043476 A1 | 2/2011 | Wraber | | |
| 2011/0185309 A1* | 7/2011 | Challinor | ................ | G06F 3/011 715/784 |
| 2011/0191674 A1* | 8/2011 | Rawley | .................... | G06F 3/016 715/702 |
| 2012/0266109 A1* | 10/2012 | Lim | ....................... | G06F 3/0485 715/863 |

(Continued)

OTHER PUBLICATIONS

Method for Providing Position Relative Audio Feedback in a Scrollable Content Area http://priorart.ip.com/IPCOM/000123619.

(Continued)

*Primary Examiner* — Scott T Baderman
*Assistant Examiner* — Barbara M Level
(74) *Attorney, Agent, or Firm* — Trellis IP Law Group, PC

(57) ABSTRACT

An example system and method for providing audio feedback to a software user when scrolling, panning, or zooming a content area. An example method includes determining one or more dimensions of the content area, which includes one or more sections; detecting a scroll command; scrolling the content such that a user interface viewport moves across the content area in accordance with the scroll command; and playing plural sounds during the scrolling to indicate a scroll direction, a scroll velocity, and to indicate a start position and an end position of the viewport relative to the content area.

19 Claims, 10 Drawing Sheets

(56) References Cited

U.S. PATENT DOCUMENTS

| | | | | |
|---|---|---|---|---|
| 2013/0151987 A1* | 6/2013 | Flynn, III | ............. | G06F 3/0488 715/753 |
| 2013/0332560 A1* | 12/2013 | Knight | ................ | H04L 67/1095 709/217 |
| 2014/0210756 A1* | 7/2014 | Lee | ......................... | G06F 3/016 345/173 |
| 2016/0105475 A1* | 4/2016 | Goodman | ............. | G06F 3/0487 715/753 |

OTHER PUBLICATIONS

Ipad Accessibility http://icanworkthisthing.com/download/docs/iPad%20accessibility%20from%20the%20user%20guide.txt.
Microsoft Scrolling Strip Prototype: Technical Description http://research.microsoft.com/en-us/um/people/kenh/All-Published-Papers/Scrolling-Strip-Technical-Unpublished-Manuscript-2000.pdf.

* cited by examiner

| Viewport | x-axis Frequency | y-axis Frequency |
|---|---|---|
|  | Highest | Highest |
|  | Lowest | Highest |
|  | Highest | Lowest |
|  | Lowest | Lowest |

AUDIO FEEDBACK FOR CONTINUOUS SCROLLED CONTENT

CROSS REFERENCES TO RELATED APPLICATIONS

This application is related to the following U.S. Pat. No. 9,026,237, entitled GENERATING AUDIO IMPRESSIONS OF DATA, filed on Sep. 21, 2012, which is hereby incorporated by reference, as if set forth in full in this specification.

BACKGROUND

The present application relates to computing and more specifically to software and accompanying systems, methods, and Use Interfaces (UIs) for providing audio information characterizing UI display screens.

Mechanisms for providing UI audio feedback as users interact with a UI are employed in various demanding applications, including screen reader software, audio books, voice-based personal assistant software, and so on. Such applications often demand efficient user friendly audio mechanisms that effectively enhance situational awareness of visually impaired users, e.g., as they interact with mobile device touch screens and associated content.

User friendly audio mechanisms can be particularly important in mobile device applications, which often involve substantial scrolling, zooming, and paging of content using relatively small device displays. Conventionally, mobile devices often operate in one of two modes, i.e., normal mode, and relatively slow screen reader mode. In normal mode, the mobile device UIs generally lack effective audio interaction mechanisms. Screen reader mode is often inefficient, slow, cumbersome, and complicated, and users may be unaware of which portion of a set of content is currently displayed within a given viewport.

SUMMARY

An example method provides audio feedback to a user when using a software User Interface (UI) to scroll content, e.g., to shift a viewport position or size (as in zooming) relative to a content area, such as a list, table, map, etc. The example method includes determining one or more dimensions of the content area, which includes one or more sections; detecting a scroll command; scrolling the content such that a user interface viewport moves across the content area in accordance with the scroll command; and playing plural sounds during the scrolling to indicate a scroll direction, a scroll velocity, and to indicate a start position and an end position of the viewport relative to the content area.

In a more specific embodiment, the example method further includes providing a user option to replay a history of audio feedback by detecting one or more scroll operations responsive to plural scroll commands; and receiving a signal from an input device to effectuate a playback of a history of the plural sounds.

The example method may further include playing the plural sounds, such that one or more properties of the plural sounds change during scrolling to indicate a number of scrolled content sections, such as items in a list comprising the content area. The plural sounds are varied in accordance with a sound-to-position mapping (including audio-property-to-position mappings) that maps viewport positioning relative to the scrollable content area. The sound-to-position mapping may associate different sound types and/or sound properties to different viewport positions relative to the content area.

In the specific embodiment, the example method further includes selectively playing a first sound during scrolling in a first direction; and varying a first property of the first sound as the first sound is played to indicate a scroll direction. The first property may include, for example, frequency, volume, bass, treble, and so on. The first sound may be of a particular type, e.g., guitar sound, piano sound, etc.

A second sound is played during scrolling of the content area as a viewport boundary passes a section or section boundary (also called section edge) in the scrolled content area. The second sound may include a percussion, such as a click, a pluck on a guitar, etc., to indicate passing of an edge of a content section into or out of the viewport. The frequency or other property (e.g., volume, bass, etc.) of the percussion may vary proportionally in accordance with viewport position relative to opposing content area boundaries along a particular scroll direction or axis.

One or more other varying sounds may be played as a viewport boundary is moved, i.e., transitions, between edges of a content section. For example, a tone with a continuously increasing or decreasing frequency may be played when scrolling between content section boundaries. Examples of content section boundaries include the as top and bottom edges of list items in one-dimensional content, and borders of regions in two-dimensional map content.

In an illustrative embodiment, scrolling includes zooming in and out on a content area, resulting in virtual expansion or contraction of the viewport. The zoom level is mapped using a third sound that varies along a third direction, i.e., z-direction.

Accordingly, various embodiments herein facilitate providing an audio impression of data (i.e., content), wherein the audio impression may include indications of relative viewport positioning, direction, and velocity, during scrolling (which may include panning and/or zooming). The indications are conveyed by varying sound types and/or other sound properties or characteristics.

Hence, selectively varying sounds as discussed herein enhance user experience and situational awareness when scrolling content while not impairing UI responsiveness or user friendliness. Resulting continuous scroll audio impressions include audio hints or indications as to the position of the viewport and associated scrolling region (i.e., content portion within the viewport), which can be particularly useful for visually impaired users and mobile device (e.g., devices with relatively small viewports, e.g., touch screens) users who frequently scroll content.

A further understanding of the nature and the advantages of particular embodiments disclosed herein may be realized by reference of the remaining portions of the specification and the attached drawings.

DETAILED DESCRIPTION OF EMBODIMENTS

Figure 1:
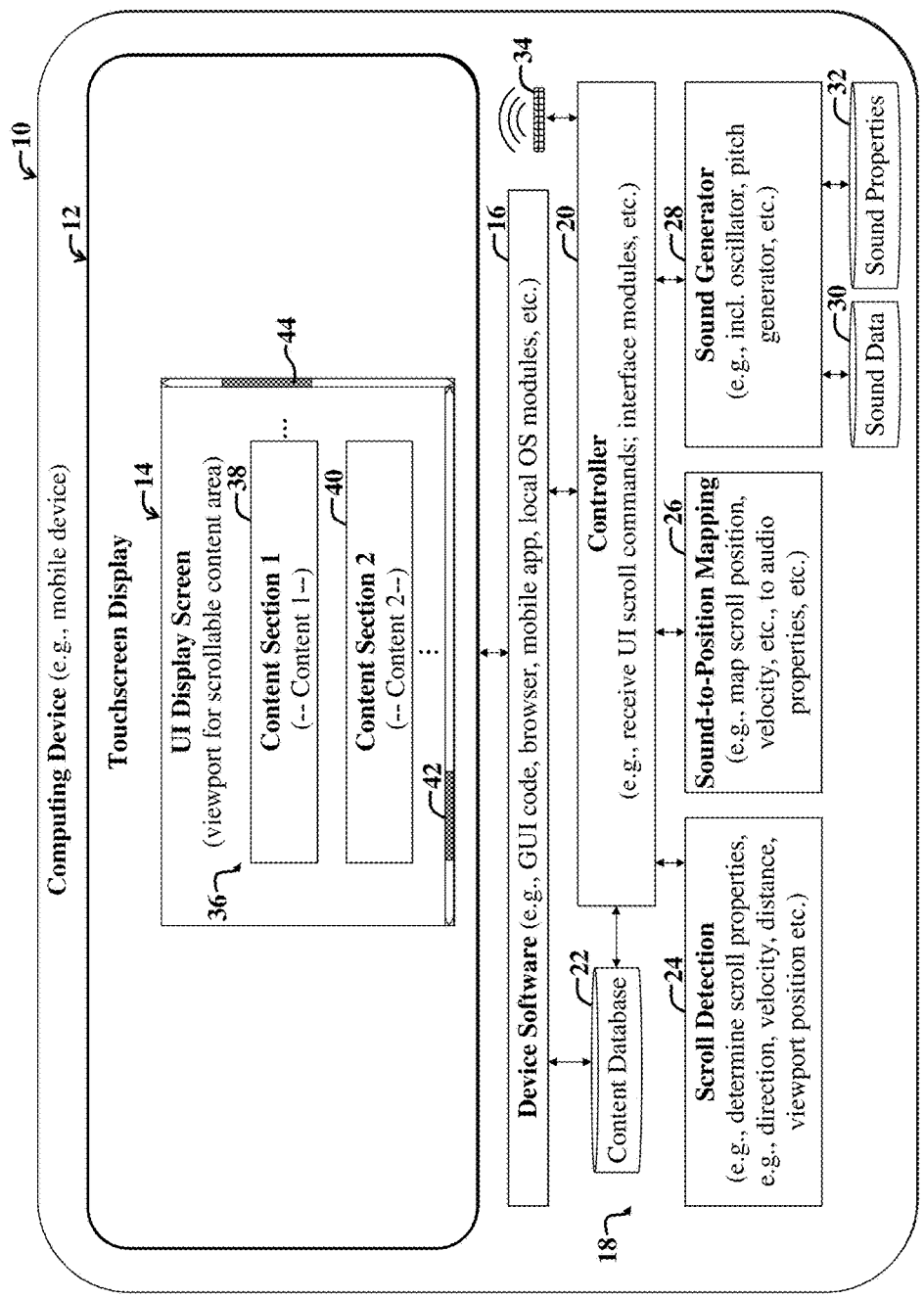
FIG. 1 illustrates a first example system that is configured to enable selective audio feedback for providing an audio impression indicative of positioning and movement of one or more viewports relative to a content area.

For the purposes of the present discussion, a viewport may be any UI display screen that encompasses or otherwise displays a portion of content of a content area, where the portion of content displayed is defined by boundaries of the viewport.

Content may be any data and/or functionality (e.g., one or more UI controls) that is or that may be visually depicted or otherwise accessible via a computer display (e.g., mobile touch screen, desktop computer monitor, screen projector, etc.).

A content area may be any a set of content (e.g., collection of data), also called a body of content (e.g., corresponding to a set of contacts in a contact list or a collection of map data and/or imagery, and so on) that is accessible within a viewport using scrolling. Scrolling may include single-dimensional scrolling (e.g., as may occur when scrolling through a list of items) and multidimensional scrolling, such as panning two-dimensional content (e.g., imagery, a set of data comprising a table, etc.), as discussed more fully below.

Examples of a one-dimensional content area include a contact list. At a particular time, the view port illustrates a portion of the content within the content area. Two-dimensional content area may comprise, for example, scrollable image data, e.g., map data or other collection of scrollable visual information. Examples of three-dimensional content areas include three-dimensional data visualizations.

Note that in certain implementations, one-dimensional and two-dimensional content can also be scrolled in a z-axis direction (also simply called the z-direction or depth direction) by zooming, as discussed more fully below.

A dimension of a content area may be any direction along which data is arranged in the content area. For example, content arranged vertically as list items is characterized by a dimension corresponding to the vertical direction, also called the y-axis or y-direction herein. In general, dimensions of a particular data item in the content area can be identified within the content area using one or more spatial coordinates, such as Cartesian coordinates (x, y, z).

Note that references to "distance" and "movement" discussed herein correspond to virtual distances and movements as modeled in software. Note that use of such terms is not limited to discussions involving scrolling of map data. For example, when scrolling one-dimensional content, e.g., a list of items, the current scroll position may correspond to a distance relative to the beginning and ending of the list of items. For example, in a scrollable list with ten items, a viewport showing only the fifth item is said to be positioned in the middle of the list, e.g., at a scroll distance of ½ or five, depending upon the needs of a given implementation (e.g., depending upon details of a particular sound-to-position mapping).

Note that a content area may be sectioned. For example, list items in a scrollable list may represent sections of a content area. Each section may include boundaries (also called borders or edges herein). For example, top and bottom edges of a table row or cell may represent content section boundaries. Content section boundaries are called internal boundaries of the associated content area. Section boundaries may or may not be visible to a user.

The position of a viewport relative to a content area may be defined and/or identified by a position of one or more boundaries or features of the viewport relative to the viewed content. For example, in certain implementations, the position of a viewport is identified by content that is displayed centrally within the viewport. In other implementations, the position of the viewport is identified by content positioned at a boundary of the viewport, e.g., positioned at the top or bottom of the viewport. The exact position within a viewport that is used to identify the position of a viewport relative to a scrollable content area is implementation specific and may vary, without departing from the scope of the present teachings.

In various embodiments discussed herein, the position of a viewport relative to a scrollable content area is used to generate one or more sounds in accordance with a sound-to-position mapping, as discussed more fully below.

For the purposes of the present discussion, a scroll operation (also simply called a scroll) may be any change of a viewport position or size relative to a content area. Hence, zooming may represent a special case of scrolling in a z-direction, i.e., a direction that appears perpendicular to a UI display screen. Similarly, panning across two-dimensional content may represent a case of scrolling diagonally across a two-dimensional content area. During scrolling, the viewport is said to move across the content or to otherwise reveal more, less, and/or different content included in the content area. The performance of a scroll operation is called scrolling.

A continuous scroll operation may be any scroll operation wherein transition of the viewport from a first position relative to the content area to a second position relative to the content area is animated. A movement of the viewport is said to be animated if content of the content area corresponding to intermediate viewport positions between the first position and the second position is displayed during transitioning of the viewport from the first position to the second position.

Hence, continuous scrolling may involve shifting of a viewport over a set of content without merely paging the content, but rather transitioning displayed content as the viewport is moved, such that new content comes into view during movement of the viewport to a second position after initiating a continuous scroll operation starting at a first position.

Paging of content may involve updating content that is displayed in a viewport only after the viewport is sufficiently moved across a content area to generate a view of a new section of content that does not include an originally displayed section of content at the first position.

Note that conventionally, continuous scrolling may refer primarily to smooth scrolling, whereby updating of the viewport in response to scrolling occurs continuously as the content area is scrolled. However, such scrolling is called smooth scrolling herein and represents a type of continuous scrolling.

A discrete scroll may be a scroll operation whereby content displayed in a viewport (also called scroll window herein) jumps during scrolling, i.e., only updates to show new content after completion of a scroll operation, such as in response to a swipe gesture used to scroll content in various mobile device UI display screens. Accordingly, paging may be a type of discrete scrolling.

Note that conventionally, discrete scrolling may primarily refer to scrolling that occurs in increments, or in discrete sections or jumps, e.g., sections demarcated by boundaries of content sections. However, such scrolling is called incremental scrolling herein.

A scroll operation may be initiated in response to a scroll command. A scroll command may be any signal generated via a UI control or gesture to initiate a scroll operation. An example gesture includes a swipe gesture applied vertically across a viewport illustrating a scrollable list. The swipe gesture may be a relatively long, short, slow, or fast gesture, where the nature of the gesture may affect resulting scroll velocity and scroll distance responsive to the gesture. For example, a long swipe gesture may result in scrolling of more content than a short swipe gesture during implementation of the associated scroll operation responsive to the scroll command.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border may be called a view or window. Views or windows may include sections, such as sub-views or sub-windows, dialog boxes, graphs, tables, list items, and so on. In certain cases, a UI display screen may refer to all application windows presently displayed on a display.

Furthermore, note that in certain implementations, e.g., mobile device implementations, UI display screens for software applications are often expanded to occupy an entire viewable area of a computer display (e.g., a touch screen, computer monitor, etc.). In such cases, when using the mobile device to view a content area, the viewport will coincide with the viewable area of the computer display.

Note that conventionally, scroll position in a document is only provided for sighted users, i.e., vision is required to see the current position in a list being scrolled, or a separate screen reader is employed. Screen reader mode or voiceover mode may involve use of a voice synthesizer to read aloud content within a given UI viewport.

Use of screen reader mode to indicate position of a viewport relative to a scrollable content area can be particularly cumbersome. For example, when scrolling a list of items (e.g., a contact list), the screen reader may read aloud the relative positioning, such as by stating "rows 1 through 5." Unlike various embodiments discussed more fully below, screen readers typically lack effective mechanisms for using audio to continuously update control position during a particular scroll operation, i.e., they lack mechanisms for providing audio feedback for continuous scroll operations, including incremental scrolling.

By enabling audio feedback for continuous scroll operations, while also providing audio scroll location information and information indicating how many items have been scrolled and/or how many items remain to be scrolled, user situational awareness is enhanced. The enhanced situational awareness represents an audio impression of data.

Accordingly, conventional screen readers can be particularly inefficient, slow, complicated, and cumbersome, especially when used to convey viewport position information (also called scroll location) during user interaction with software content, e.g., content presented via a mobile device. Various embodiments discussed herein provide efficient audio mechanisms for enhancing user situational awareness, including awareness of relative viewport positioning, e.g., during continuous scroll operations.

For clarity, certain well-known components, such as hard drives, processors, operating systems, power supplies, routers, the Internet, servers, microphones, and so on, are not necessarily explicitly called out in the figures. However, those skilled in the art with access to the present teachings will know which components to implement and how to implement them to meet the needs of a given implementation.

FIG. 1 illustrates a first example computing system 10 that is configured to enable selective audio feedback during user interaction with a UI display screen 14 depicted using a touchscreen display 12. The system 10 generates an audio impression indicative of positioning and movement of one or more viewports 14 relative to a content area 36.

The example system 10 includes device software 16, such as a mobile operating system, Graphical User Interface (GUI) code for generating rendering instructions for depicting the UI display screen 14 via the touchscreen display 12, a browser, mobile applications (also simply called apps), and so on. The UI display screen 14 is also called a viewport herein.

The example viewport 14 includes a vertically and horizontally scrollable content area 36, as indicated via respective horizontal and vertical scroll bars 42, 44. Note that the scroll bars 42, 44 may be omitted from an actual touchscreen implementation, where touch gestures may suffice. Note that the actual implementation details for a UI control used to implement a scroll operation are implementation specific and may vary, without departing from the scope of the present teachings.

For the purposes of the present discussion, a UI control may be any feature or displayed element or component of a UI display screen, which is adapted to enable a user to provide input, view data, and/or otherwise interact with a UI. Additional examples of UI controls include buttons, drop down menus, menu items, tap-and-hold functionality, swipe gestures, and so on. Similarly, a UI control signal (also simply called control signal herein) may be any signal that is provided as input for software, wherein the input affects a UI display screen and/or accompanying software application or data associated with the software.

Note that, in the present example embodiment, the content sections 38, 40 comprise the viewport portion of the underlying content area 36. The viewport portion is shifted to reveal new viewport content in response to a horizontal and/or vertical scroll operation. Furthermore, note that while the content sections 38, 40 represent sub-sections of a body of scrollable content 36 (also called content area), that each content section 38, 40 may also be individually scrollable.

Furthermore, while the content area 36 is shown as a two-dimensional content area that can be scrolled horizontally and/or vertically or otherwise panned or zoomed, embodiments are not limited to such content areas. For example, in a one-dimensional implementation, the content sections 38, 40 correspond to a one-dimensional list of vertically scrollable list items.

Additional audio feedback modules 18 provide functionality usable by the device software 16 to selectively generate sounds indicative of scroll position, distance, (e.g., of the UI display screen 14 relative to an underlying content of the content area 36), velocity, and so on, as discussed more fully below. The generated sounds are called audio feedback herein, as they are generated as feedback, i.e., in response to a user initiated scroll operation.

The audio feedback modules 18 include a controller 20 in communication with a scroll detection module 24, a sound-to-position mapping module 26, and a sound generator 28. The sound generator 28 further leverages existing sound data 30 (e.g., comprising audio files) and stored sound properties information 32.

The sound properties information 32 may include various filters, audio frequency shifters, volume settings, bass settings and filters, treble settings and filters, percussion durations, sustain settings, and so on, as needed for a given implementation. The sound properties information 32 may include data and functionality (in the way of computer code or instructions) usable by the sound generator 28 to selectively adjust properties of different sounds in the sound database 30.

For the purposes of the present discussion, a percussion may be any momentary, relatively briefly played sound, such as click, piano key press, guitar string pluck, other played note, etc. The terms percussion and percussive sound are employed interchangeably herein.

Note that the stored sound properties information 32 (as may be maintained in a database) may also include playback history information, enabling users to replay audio feedback that has been provided during a given user interaction (involving scrolling) with a UI display screen, as discussed more fully below. Alternatively, sound history information is stored among the sound data 30, e.g., in a sound database. Accordingly, the device software 16 and/or controller 20 may include computer code for providing a user option (e.g., UI control or mechanism) to replay a history of audio feedback (e.g., that has accrued during a particular user software-interaction session) by detecting one or more scroll operations responsive to plural scroll commands (that have occurred during the session or other predetermined interval), and then receiving a signal from an input device (e.g., touch screen) to effectuate a playback of a history of the plural sounds. The history of audio feedback is called audio history herein. A history of scroll operations (called scroll history herein) is mapped to the audio history and/or vice versa via one or more sound mapping functions.

The controller 20 further communicates with a content database 22 and the device software 16. The device software 16 may also communicate with the content database 22. The device software may leverage content stored in the content database 22 to provide underlying content used to depict the UI display screen 14 and associated content (of the content area 36) in the viewport 14.

The controller 20 acts as an interface facilitating communications between and use of the various modules 16-32, including audio feedback modules 24-32. The controller 20 may also include computer code for selectively activating a speaker 34 to play a sound generated by the sound generator 28 in response to a scroll command (provided by a control signal) generated by the device software 16 in response to user input, and detected by the scroll detection module 24.

In certain implementations, the controller 20 may further include network communication resources for communicating with server-side software and data, such as that provided via websites and/or other remote databases.

The controller 20 may also act as a plugin driver for the audio feedback modules 24-28, e.g., when the modules 24-28 are implemented as plugins to the controller 20. For the purposes of the present discussion, a driver may be any computing resource that acts as an interface to one or more modular components, where the interface enables delivery of control signals to the one or more modular components. In the case of a plugin driver, e.g., the controller 20, the modular components represent software modules 24-28, and the driver is said to host plugins. A plugin may be any software module or component (e.g., extension, add-on, etc.) or collection thereof that is adapted to couple with (i.e., communicate with) another software module to add specific features or functionality thereto.

Note that the controller 20 may itself be implemented as a plugin to device software 16. In such case, the audio feedback modules 24-28 may represent sub-plugins of the device software 16.

Note that various modules of the system 10 may be grouped, arranged, coupled, and/or distributed differently than shown, without departing from the scope of the present teachings. Similarly, in certain implementations, interconnections between modules may be different than those shown.

For example, in an alternative grouping, the audio feedback modules 18 may be integrated into existing device software 16 or otherwise implemented as an Application Programming Interface (API), browser plugin, and/or other module(s).

Furthermore, while the device software 16 is showing using content from a local content database 22, embodiments are not limited thereto. For example, content may be alternatively or additionally derived from a remote network-based source, such as a webpage and/or network-coupled database. For the purposes of the present discussion, a database may be any collection of data.

In addition, the sound data 30 and sound properties data 32 may be alternatively directly coupled to the controller 20, which then coordinates information exchange between the sound generator 28 and the sound databases 30, 32.

In an example scenario, a user initiates a downward continuous vertical scroll operation by applying a downward swipe to the UI display screen 14 or by touching and moving the vertical slider bar 44 downward. Characteristics (e.g., direction, velocity, and scroll distance to cover) of the scroll (to be performed) are encoded in a UI control signal (responsive to user input effective to initiate a scroll operation), which is relayed to the scroll detection module 24.

The scroll detection module 24 includes computer code for determining scroll properties, including scroll direction (which in the present use case scenario is downward), scroll velocity or speed, scroll distance, and resulting viewport positioning relative to the content area 36.

For the purposes of the present discussion, scroll distance may be any measurement indicating a position of a viewport relative to one or more boundaries of a scrollable content area (e.g., the content area 36). For example, the scroll distance may be expressed as a percentage or fraction, whereby, for example, a viewport positioned or centered midway between a top and bottom of a list may be characterized as ½.

Note that in certain implementations, scroll distance can be measured by counting content sections 38, 40 traversed during a scroll operation, such that scroll distance is set forth in terms of a number of content items (i.e., scroll distance has units of "items").

Scroll speed may be a rate of change in scroll distance of a viewport (e.g., the viewport 14) as it changes scroll position, i.e., moves across a content area (e.g., content area 36). Scroll velocity may be a unit or item of information that specifies both scroll speed and scroll direction.

Note that continuous audio indications (e.g., using a continuously varying tone) or periodic audio indications (e.g., using a click sound or other percussions) of a current position of the viewport 14 during scrolling may provide sufficient information for a user to perceive viewport velocity information (corresponding to scroll velocity) and other information (e.g., displayed content type). Note that even a monotonic percussion played when a viewport boundary crosses a boundary of a subsection 38, 40 of the content area 36 may indicate velocity information encoded by the varying time intervals between percussions when scrolling relatively quickly or slowly.

Scroll direction information may be encoded via use of different sounds and/or sound properties to indicate different scroll directions. For example percussions played as an edge (e.g., top, bottom, left, or right edge) of the viewport 14 may vary in property (e.g., frequency, volume, sustain etc.) with scroll distance.

The rate and way the sound or sound property changes may be dictated by a sound-to-position mapping (also simply called sound mapping function, sound mapping, or audio function herein). The sound-to-position mapping may specify, for example, that the frequency of audio percussions played incrementally (as the viewport 14 transitions across content sections 38, 40 or boundaries thereof) may vary linearly with scroll distance, such that the sound-to-position mapping (as implemented by the sound-to-position mapping module 26) represents a linear function that maps different incremental audio frequencies to incremental scroll positions. For example, the percussions may scale in frequency as a function of the percentage of distance scrolled by the viewport 14 (i.e., viewport movement distance) from one end of the content area 36 to an opposite end of the content area 36.

Note that a continuously increasing or decreasing tone may be any sound whose frequency linearly varies with time, e.g., as during a scrolling time interval (i.e., corresponding to the duration of a scroll operation). Accordingly, a linear sound-to-position mapping characterizing a constant-speed scroll may represent a continuously increasing or decreasing tone.

In other implementations, such as when navigating three-dimensional content in the content area 36, the sound-to-position mapping function (also simply called mapping function herein) is nonlinear, such that, for example, the function may vary nonlinearly with distance, e.g., so as to indicate or convey texture information characterizing the visualization during scrolling in a given direction.

For the purposes of the present discussion, a sound may be any propagating wave, compression, oscillation, and/or vibration, including audio. Audio may be any audible sound, e.g., any sound that may be heard by a user of the system 10.

A first sound is said to be a different sound than a second sound if the second sound is characterized by plural different audio properties than the second sound, and vice versa. Examples of plural different audio properties includes different frequencies, treble, sustain, etc., as discussed more fully below.

Accordingly, note that the term "different sound" may also refer to different sound types (also called audio types) or vice versa. Examples of different sounds that represent different sound types include, a guitar sound versus a piano sound; a drum sound versus a trumpet sound; a whistle sound versus a horn sound, and so on.

A first sound is said to be a variation of the second sound if the first sound varies in a particular sound property (e.g., frequency, volume, etc.). For example, a tone at a first pitch represents a variation of the same tone at a second pitch. Accordingly, note that a first sound that is a variation of a second sound may also be a different sound than the first sound, i.e., may differ by more than one sound property from the second sound.

For the purposes of the present discussion, a sound property may be any audibly distinguishable characteristic or quality of a sound, e.g., frequency (also called pitch herein), duration (also called sustain herein), loudness (also called volume herein), timbre (also called sound quality herein), texture, spatial location, noise level, echo, reverberation, bass level, volumes associated with different frequency components (e.g., graphic equalizer settings), type of applied acoustic filtering (e.g., distortion property set by use of a distortion filter on source sound data), and so on.

Accordingly, a sound property may include any audible context information characterizing a given sound. The terms sound property and audio property are employed interchangeably herein.

Additional details of an example computing system that may be readily adapted to implement embodiments discussed herein by those skilled in the art are disclosed in the above-identified and incorporated U.S. Pat. No. 9,026,237, entitled GENERATING AUDIO IMPRESSIONS OF DATA.

Figure 2:
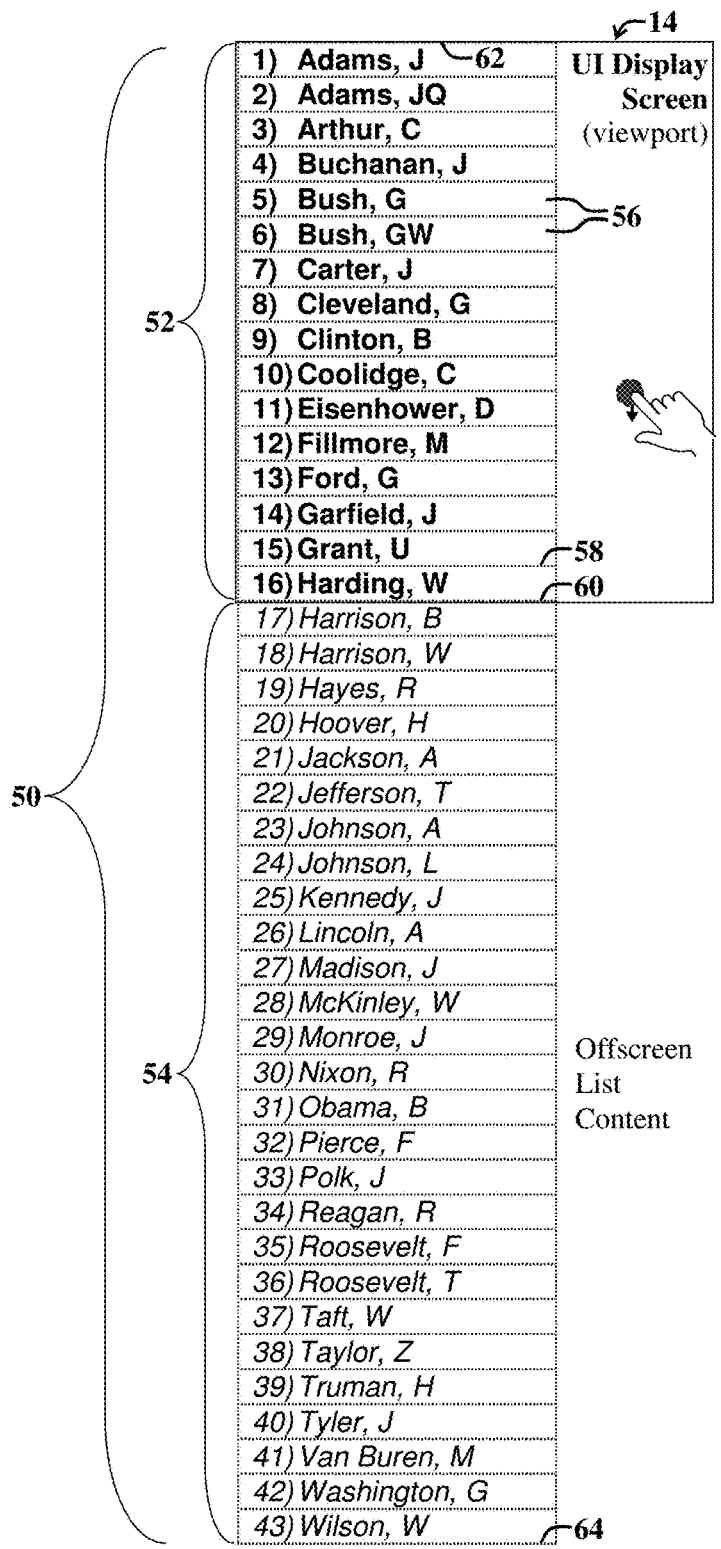
FIG. 2 illustrates an example content area comprising a scrollable list of items or sections, wherein the initial viewport position is at a top end of the content area, where scrolling may result in production of a relatively high frequency sound.

FIG. 2 illustrates an example content area 50 comprising a scrollable list of items or sections 56, wherein the initial position of the viewport 14 is at a top end of the content area 50. In the present example embodiment, downward scrolling applied to the viewport 14 may result in production of a relatively high frequency sound, relative to a sound played when the viewport 14 is scrolled along a different section of the content area 50.

The example content area 50 includes displayed and non-displayed content area portions 52, 54, respectively. The displayed content area portion 52 includes content, e.g., list items 56, which are currently displayed in the viewport 14. The non-displayed content area portion 54 includes off-screen content, i.e., content not shown in the viewport 14.

The content area 50 represents a one dimensional content area (i.e., that can be scrolled in one dimension only) characterized by an upper boundary 62 and a lower boundary 64. In FIG. 2, the upper content area boundary 62 coincides with an upper boundary of the viewport 14.

The list items 56 of the displayed content area portion 52 include upper and lower boundaries (also called edges), e.g., boundaries 58, 60. Note that boundaries of adjacent subsections (e.g., list items 56) may overlap or coincide, such that the upper boundary of one list item coincides with a lower boundary of an adjacent list item. Furthermore, note that content area section boundaries (e.g., boundaries 58-64)

need not necessarily be visible. Furthermore, note that content section boundaries may coincide with viewport boundaries.

For the purposes of the present discussion, an internal boundary of a content area, e.g., the content area 50, may be any boundary of a section or portion of content within or coinciding with the content area. Hence, an upper edge 58 and a lower edge 60 of a content section (e.g., list item 16) represent internal boundaries of the first portion of content 52 displayed within the viewport 14.

Figure 3:
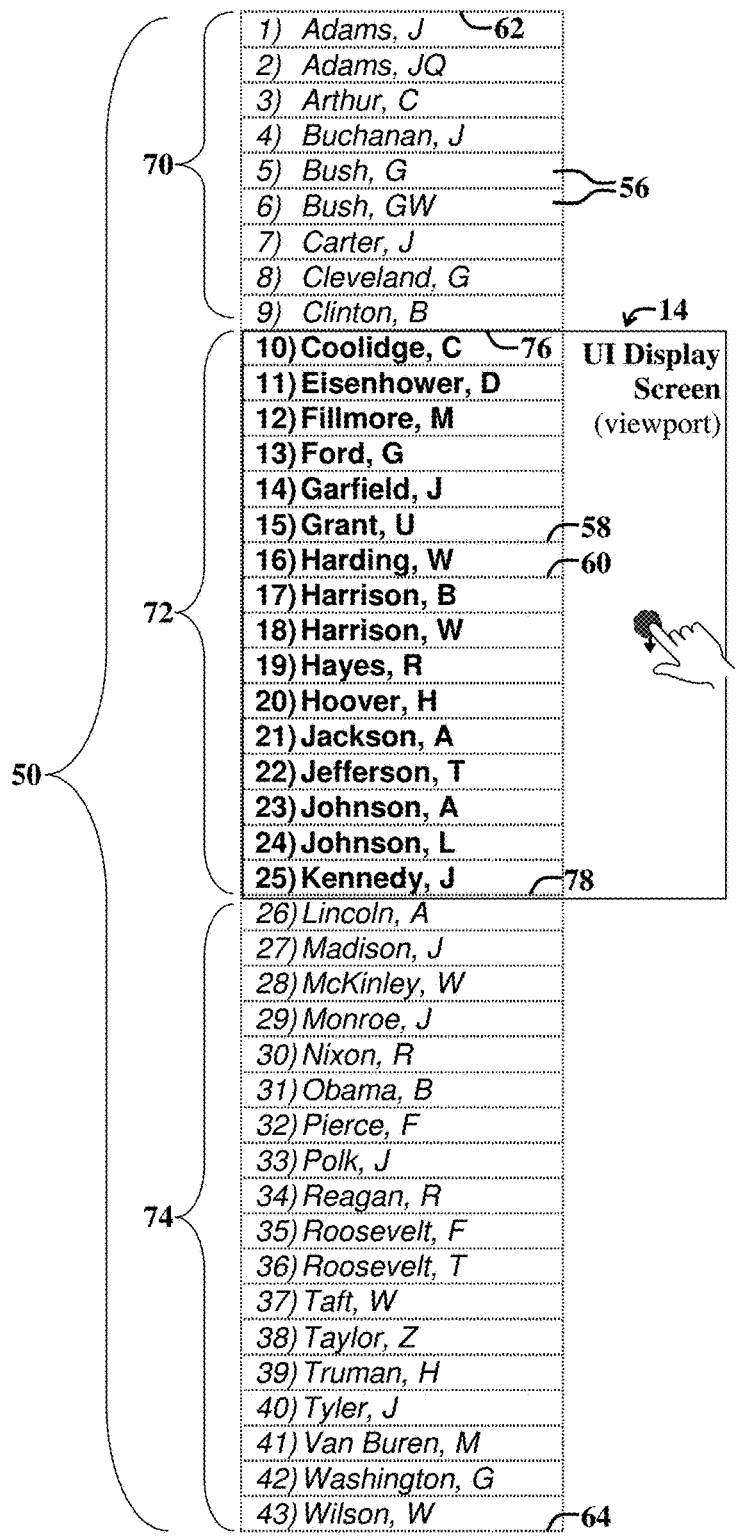
FIG. 3 illustrates the content area of FIG. 1 after the viewport is moved further down the scrollable list in accordance with a scroll command to initiate a downward scroll operation, wherein a scroll operation results in production in a lower frequency sound than when scrolling to or from the scroll position of the viewport shown in FIG. 2.
Figure 4:
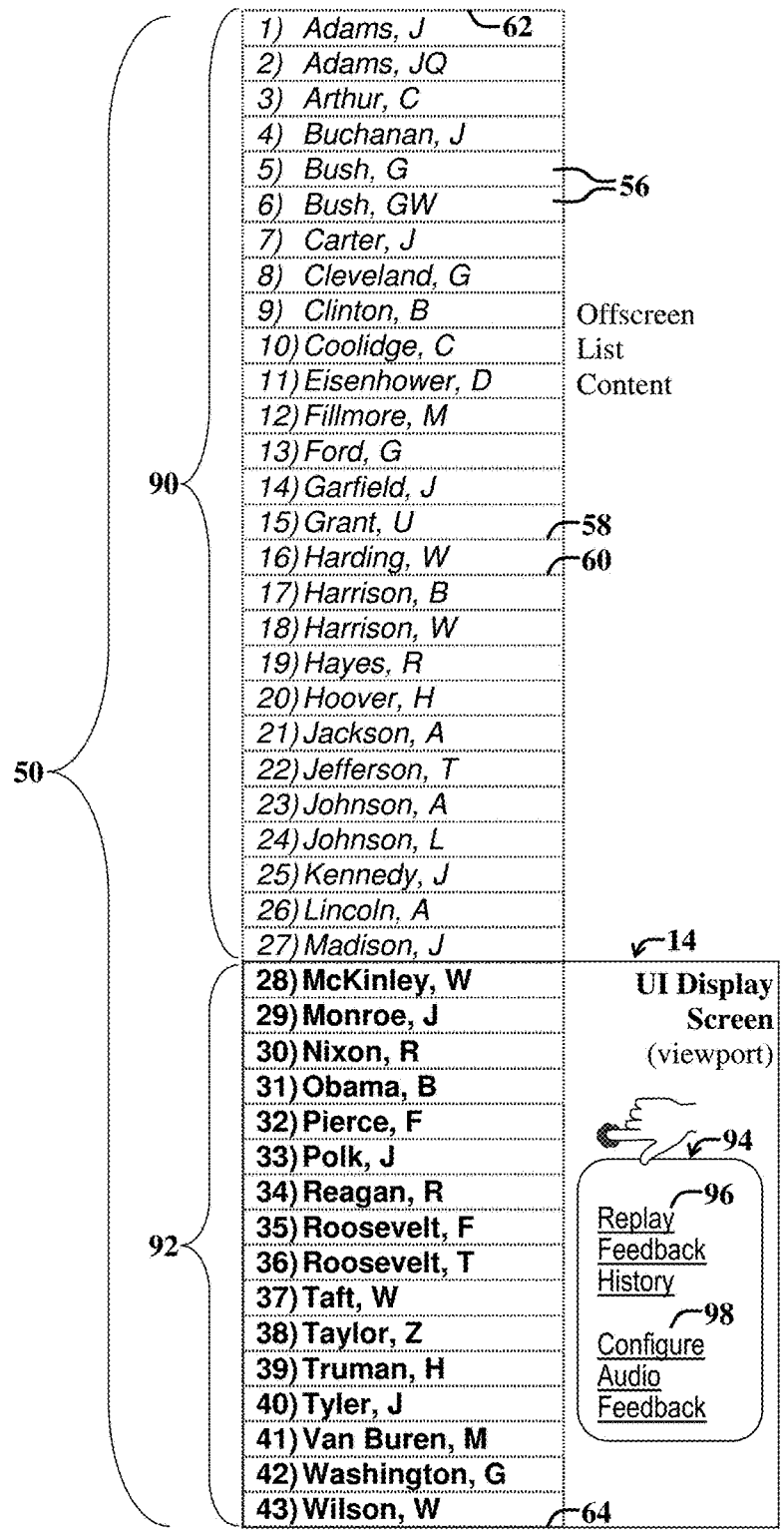
FIG. 4 illustrates the content area of FIG. 1 after scrolling to a bottom end of the content area, where a relatively low frequency sound is played when scrolling, and where an end-of-list percussion or other sound is played.

In a scenario depicted in FIGS. 2-4, the viewport position in FIG. 2 represents an initial viewport position. The position may be identified or labeled by a position of a top and/or bottom edge or other aspect (e.g., a particular internal boundary, e.g., a selected edge 58 of a list item 58) of the viewport 14.

Note that the position of the viewport 14 (also called scroll position of the viewport 14) may be identified or labeled by specifying a range of content sections shown within the viewport 14, e.g., content sections 1-16.

Alternatively, viewport position may be specified as a percentage or ratio of scroll distance traversed to arrive at a current viewport position to a maximum scrollable distance across the content area 50. In the present example embodiment, the maximum scrollable distance corresponds to the length of the offscreen content 54 (also called non-displayed content area portion). The length may be, for example, twenty six, which corresponds to the number of list items in the offscreen content 54. Alternatively, discrete lengths (e.g., as identified by integers) may be mapped into continuous lengths (e.g., as identified by rational numbers), e.g., as may be used during audio feedback mapping (e.g., sound-to-position mapping) used convey information about smooth scrolling, i.e., non-incremental continuous scrolling.

FIG. 3 illustrates the content area 50 of FIG. 1 after the viewport 14 is moved further down the scrollable list in accordance with a scroll command to initiate a downward scroll operation. The downward scroll operation results in production of a lower frequency sound than when scrolling to or from the scroll position of the viewport shown in FIG. 2.

The content area 50 is showing new content portions, including an upper offscreen portion 70 and a lower offscreen portion 74, which are adjacent to an onscreen portion 72. With reference to FIGS. 2 and 3, a top edge 76 of the viewport 14 shown in FIG. 3 has moved downward relative to the top edge 62 of the viewport of FIG. 2 by a scroll distance corresponding to nine list items, i.e., the number of list items in the upper offscreen portion 70.

List items 1-9 have been moved out of the viewport 14 of FIG. 2 to make way for the display of new list items 17-25 in the displayed content portion 72. Accordingly, the viewport 14 of FIG. 3 has moved a distance corresponding to a vertical height of the first nine list items, which comprise the upper content portion 70.

Furthermore a lower viewport edge 78 has moved downward by a distance of nine list items relative to the corresponding viewport edge 62 of FIG. 2. Accordingly, the distance moved by the viewport 14 may also or alternatively be identified by movement of the lower edge 78, or movement of another reference point that is fixed within the viewport 14.

The rate at which the viewport 14 is vertically scrolled between positions (e.g., nine list items in ten seconds) represents the vertical speed or velocity of the viewport 14 during scrolling.

FIG. 4 illustrates the content area 50 of FIG. 1 after scrolling to a bottom end 64 (also called a lower boundary of the content area 50) of the content area 50. The viewport 14 has moved to a new position and includes a newly displayed content portion 92 (comprising list items 28-43). When scrolling the viewport 14 near the bottom of the content area 50, a relatively low frequency sound is played (as audio feedback) as compared to the frequency of audio feedback played when scrolling from a higher in the content area 50.

Furthermore, when the scroll window 14 reaches the end of the content area 50 during a scroll operation, an additional or separate end-of-content indicator sound (e.g., an end-of-list percussion or other sound) is played to punctuate the audio impression that the viewport 14 is at the end of the content area 50. Similarly, another sound may be played to demarcate movement of the content window so that it abuts the top edge 62 of the content area 50.

Accordingly, underlying methods implementable by the system 10 of FIG. 1 (and further illustrated in FIGS. 2-4) for providing audio feedback can be applied to data, i.e., content, that contains list items (single dimension) or even grid boundaries for two-dimensional scrolled data. One example method involves playing a sound at item boundaries. For example, as each list item (also called grid item or table item) is scrolled by, a percussive (or clicking) sound may be played. This provides the user with audio feedback indicating an exact number of scrolled list items when scrolling slowly, or an estimated number of scrolled list items if scrolling rapidly.

An additional sound or second sound may be, for example, a continuously varying tone or pitch that is played continuously during smooth scrolling and that increases or decreases in frequency (and/or other property) as the viewport 14 moves across the content area 50. A third sound may be played when the viewport 14 is scrolled to a position that abuts a boundary (e.g., upper boundary 62 and/or lower boundary 64) of the content area 50, i.e., when the viewport 14 is scrolled to a terminal or end position in the content area 50.

Note that in certain implementations, the content area 50 may include plural sub-content areas or sections that may be separately demarked in the overall content area 50. Scrolling the viewport 14 so that an edge thereof crosses such demarcation may result in production of yet an additional sound.

Note that various sounds discussed herein, e.g., tones, guitar sounds, piano sounds, etc., may exhibit properties that may be varied to convey scrolling-related information (e.g., scroll position information) of a viewport. Accordingly, variations in sound type and sound property may be used to selectively encode or map information about a scrolling activity (i.e., scroll operation) into a played audio signal, e.g., into a collection of one or more sounds and/or sound properties that may be played during a given scroll operation.

In the present use case scenario, a user has activated an options menu 94, which provides a first user option via a first UI control 96 and a second user option via a second UI control 98. The first UI control 96 may be a user selectable link, which when selected triggers display of another dialog box for configuring playback history settings (also called audio history settings). Alternatively, user selection of the playback UI control 96 triggers a replay of audio feedback that has occurred within a particular predetermined interval, e.g., as may be predetermined by a user by accessing playback settings. The replaying of audio feedback represents the playing of an audio history.

Note that additional user options for configuring audio feedback playback settings may be provided in a view or window that is triggered in response to user selection of a configuration option 98. Examples of configuration options that may be provided in such a view or window include an option to allocate different sound types to different scroll events; an option to adjust a sound-to-position mapping (e.g., by specifying a volume mapping as opposed to a frequency mapping); an option to select types of sounds to vary to illustrate different information about a scroll operation, and so on.

Figure 5:
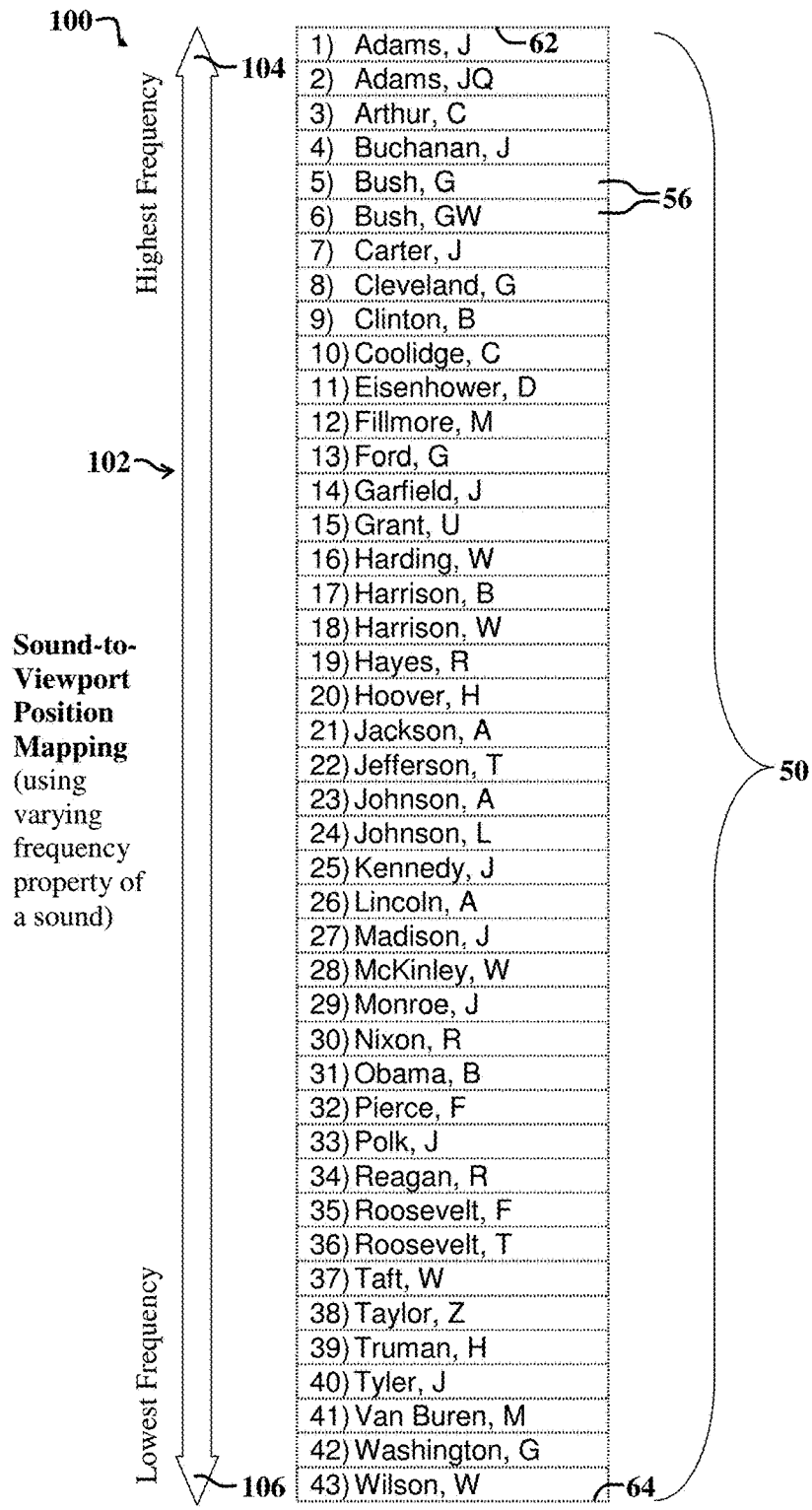
FIG. 5 illustrates an example sound property (e.g., frequency) mapping that represents a sound-to-position mapping for a viewport moved across (e.g., up or down) the content area 50.

FIG. 5 illustrates an example sound property (e.g., frequency) mapping 100 that represents a sound-to-position mapping for a viewport moved across (e.g., up or down) the content area 50 along a direction parallel to a vertical axis 102.

The sound-to-position mapping 100 of FIG. 5 involves mapping or assigning a relatively low frequency 106 sound to scroll positions near a bottom edge or boundary 64 of the content area 50 and a relatively high frequency version 104 of the same sound to scroll positions near a top boundary 62. Frequencies assigned to intermediate scroll positions (e.g., positions between the boundaries 62, 64) may vary continuously and may be played constantly during smooth scrolling.

Hence, the sound-to-position mapping 100 involves outputting audio (i.e., playing a sound) characterized by the top 104 of the mapped frequency range 102 at the highest viewport scroll positions; and outputting audio characterized by the bottom 106 of the frequency range 102 at lowest viewport scroll positions.

Incremental sounds, e.g., percussions may also be played as a viewport scroll position is moved across list item boundaries. The percussion may augment, i.e., be played in addition to a continuously varying and continuous (during a given scroll operation) sound.

Note that in certain implementations the continuously varying sound may be omitted. Instead, a frequency of each percussion may be further adjusted or mapped in accordance with the sound-to-position mapping 100. Use of varying percussions can be suitable for discrete continuous scroll operations as well as smooth scroll operations.

Note that a sound mapping function for a continuous scroll operation (e.g., a smooth scroll operation) need not necessarily be limited to a continuous sound mapping function. For example, a sound mapping function could instead map the continuous scroll position to a discrete sound domain (and/or incremental sound domain) in accordance with a discrete sound mapping function.

A discrete sound mapping function may specify, for example, selective allocation of discrete sounds or percussions to different locations, borders, sections, positions, zoom levels, and so on. For example, if the UI were supporting a 'snap' scroll, where list items snap to discrete positions when scrolling, the audio function (i.e., sound mapping function) could be designed to signify this snap by mapping the snap points to say the notes of a piano.

Furthermore, note that various embodiments discussed herein are not limited in applicability to conveying audio impressions for continuous scrolling. For example rapid paging of content involving shifting of content areas may also be augmented with audio feedback as discussed herein, without departing from the scope of the present teachings.

Zooming of a viewport into a content area 50, such that the viewport appears to expand or contract to include more or fewer list items may be considered a type of z-axis or depth-wise scrolling. Such scrolling may also be mapped to sounds or sound properties comprising audio feedback that indicates zoom level, zoom velocity, zoom position, etc.

In summary, with reference to FIGS. 2-5, an embodiment involving use of audio feedback for one-dimensional scrolling of a list of items (comprising a content area) is shown. The embodiments of FIGS. 2-2 illustrate a use case where a user scrolls vertically to navigate a list of presidents.

Note that conventionally, contact lists are often longer than can be displayed within a given viewport, as can be especially true for small viewports of mobile devices.

Figure 6:
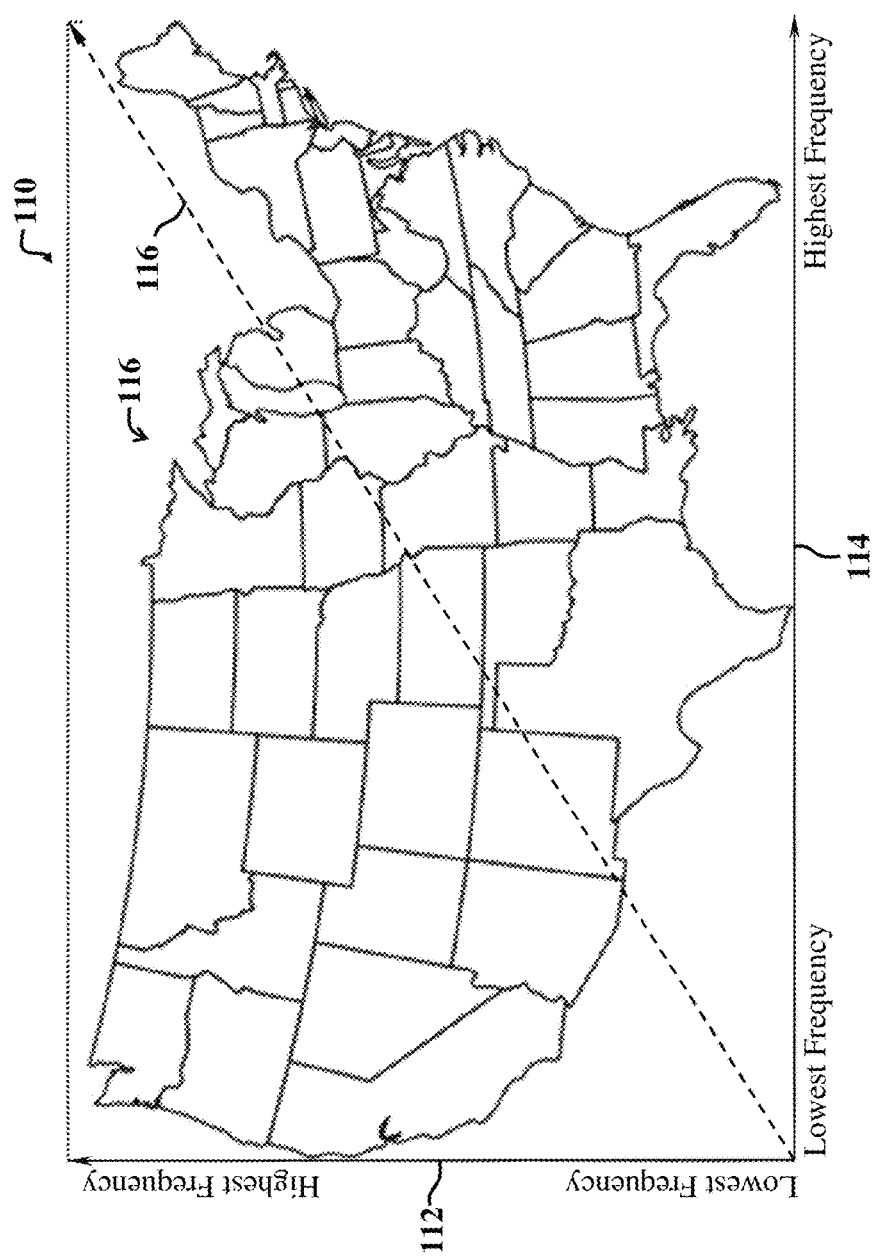
FIG. 6 illustrates a second sound-to-position mapping suitable for determining audio feedback when scrolling or panning a two-dimensional content area, such as a content area containing a map.

FIG. 6 illustrates a second sound-to-position mapping 110 suitable for determining audio feedback when scrolling or panning a two-dimensional content area, such as a content area containing a map 116.

Positions on the map (which represents an example of a two-dimensional content area) 116 may be allocated coordinates, e.g., Cartesian coordinates (also called x-y coordinates herein).

In the sound-to-position mapping of FIG. 6, each x-coordinate of a given scroll position (also called viewport position herein) is frequency mapped in accordance with an x-coordinate frequency mapping (which represents a type of sound-to-position mapping) as labeled along an x-axis (also called a horizontal axis) 114 of FIG. 6. The x-coordinate frequency mapping 114 may function similarly to the one-dimensional frequency mapping 100 of FIG. 5, but for x-coordinate position data. Note that variations in frequency emitted for horizontal scrolling may be audible when moving a viewport position along the x-axis 114.

Similarly, each y-coordinate of a given scroll position is frequency mapped in accordance with a y-coordinate frequency mapping as labeled along a y-axis (also called a vertical axis) 112. The y-coordinate frequency mapping 112 may function similarly to the one-dimensional frequency mapping of FIG. 5, but for y-coordinate position data. Sound frequency variations characterizing vertical scrolling may be audible as a viewport moves vertically relative to the horizontal axis 114.

Note that when scrolling diagonally, i.e., panning, e.g., moving a viewport along a diagonal path 116, simultaneous sounds may be played to indicate an x-axis position coordinate and a y-axis position coordinate characterizing each viewport position along the path 116. Alternatively, the different sounds may be played in discrete increments that are spaced or interleaved during a panning operation to facilitate enabling a user to audibly distinguish x-axis and y-axis sounds and frequencies.

Note that additional sounds, e.g., a third sound, may be played as a viewport boundary traverses an internal boundaries of the two-dimensional content 116. Examples of internal boundaries of the two-dimensional content 116 include state boundaries.

In summary, the sound-to-position mapping 110 of FIG. 6 may be applied such that a separate (i.e., different) sound is selectively played for scroll operations along different axis (i.e., x-axis 114, y-axis 112).

Selective playing of different sounds (which may include selective variance of one or more sound properties and/or sound types) as discussed herein enables users to readily distinguish the different sounds for the different axis 112, 114. The different sounds may include, for example, a piano scale played for different positions relative to the x-axis and a guitar scale may be played for different scroll positions relative to the vertical axis 112.

Note that ranges of sound properties, e.g., a sound frequency space (i.e., frequency range or band), may be separated and allocated to different axis 112, 114. In such case, x-axis scrolling may trigger playing of a range of pitches, from low to high, based on the scroll position along the x-axis (e.g., as identified by the x-coordinate of the scroll position). Similarly, y-axis scrolling may trigger playing of a different range of pitches, from low to high, as the scroll position along the y-axis (also called y-position) changes from low to high. Such provides users with audio positioning information characterizing the scrolling position of a view port relative to a two-dimensional content area, e.g., scrollable map.

Figure 7:
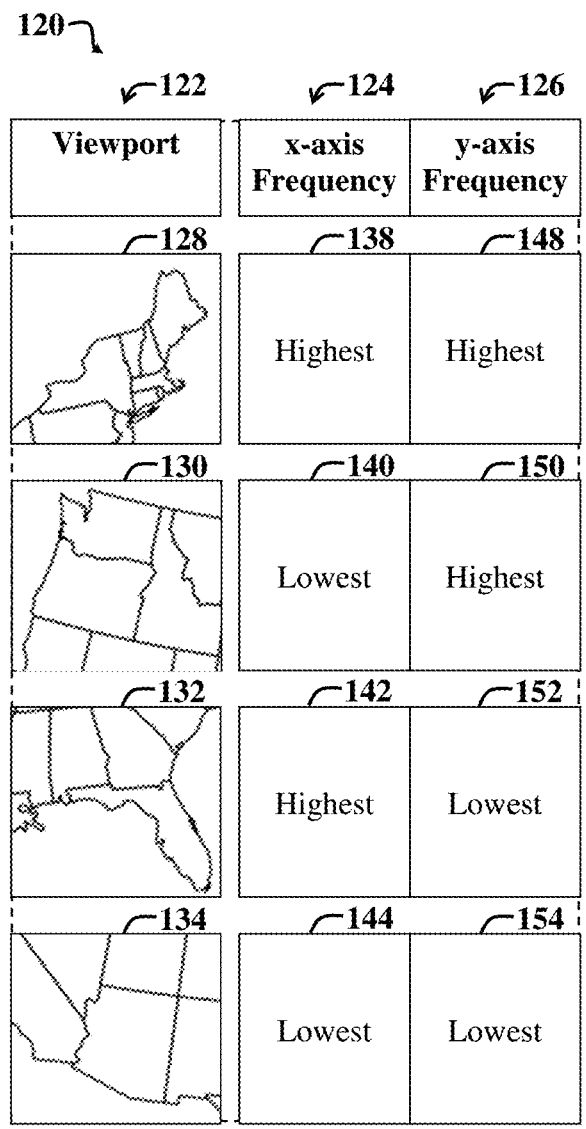
FIG. 7 illustrates a third sound-to-position mapping similar to the sound-to-position mapping of FIG. 6, but illustrating assignment of highest and lowest frequency values to selected regions of a map.
Figure 7:
Figure 7:
Figure 7:

FIG. 7 illustrates a third sound-to-position mapping 120 similar to the sound-to-position mapping of FIG. 6, but illustrating assignment of highest and lowest frequency values to selected regions of a map. The mapping 120 of FIG. 7 is illustrated via a table that includes a viewport position column 122 (comprising elements 128-134), an x-axis frequency column 124 (comprising elements 138-144), and a y-axis frequency column 126 (comprising elements 148-154).

A first viewport position 128 represents an upper-rightmost viewport position. The first viewport position 128 is characterized by or associated with a highest pitch x-axis sound frequency and a lowest pitched y-axis sound frequency, as indicated by adjacent row items 138, 148, respectively.

A second viewport position 128 represents an upper-leftmost viewport position. The second viewport position 128 is characterized by or associated with a lowest pitch x-axis sound frequency and a highest pitched y-axis sound frequency, as indicated by adjacent row items 140, 150, respectively.

A third viewport position 132 represents a lower-rightmost viewport position. The third viewport position 132 is characterized by or associated with a highest pitch x-axis sound frequency and a lowest pitched y-axis sound frequency, as indicated by adjacent row items 142 152, respectively.

Similarly, fourth viewport position 134 represents a lower-leftmost viewport position. The fourth viewport position 128 is characterized by or associated with a lowest pitch x-axis sound frequency and a lowest pitched y-axis sound frequency, as indicated by adjacent row items 144, 154, respectively.

Note that various sound frequencies (e.g., exemplified by entries in the x-axis frequency column 124 and the y-axis frequency column 126) may be mapped discretely to different grid regions of an underlying content area. The grid regions may or may not correspond to the size of a viewport, which depends upon the needs of a given implementation.

In summary, FIGS. 6 and 7 illustrate example sound-to-position mappings for providing audio feedback when scrolling two-dimensional content areas.

In an example mapping scenario, where the map universe, i.e., content area, is a map 10 of the United States, various types of sound-to-position mapping may be used to convey information characterizing a two-dimensional scroll operation.

Sound-to-position mapping functions for a two-dimensional scroll are called audio pan mappings herein. With audio pan mapping, when a viewport has been zoomed in on a content area, e.g., the map 110, audio pan mapping provides provide feedback to the user about the position of the pan viewport.

When the user pans a viewport, e.g., representing a zoomed version of the map 110, the associated audio pan mapping function emits two frequencies, one based on the x-axis pan position and another based on the y-axis position.

A linear audio pan mapping function may be illustrated by overlaying or otherwise adding mapping descriptions (e.g., as indicated via one or more axis labels) to a particular axis. Note that various types of mappings may be employed separately or in selective combination. Example mapping types include mapping of instrument sounds (instrument mappings), mapping of frequencies, mapping of frequency partitions, and so on.

When using instrument mappings, different instruments can be assigned to or associated with different axis. For example, a piano could be used for the x-axis while a saxophone would be used for the y-axis. The example instrument mapping may represent a combination mapping, to the extent that the mapping involves both a frequency distinction and a sound envelope distinction.

When using frequency partitioning, a lower half of a frequency range could be used for an x-axis, while the upper half of a frequency range could be used for the y-axis. For example, the frequency range defined by the first 44 keys of an 88 key piano could be used for the x-axis, while the last 44 keys are used for the y-axis.

Note that methods underlying various embodiments discussed herein may be further extended to applications not necessarily involving movement of a viewport across a content area. For example, audio feedback may be provided in accordance with the present teachings to indicate cursor positioning or touch point on a UI display screen.

Note that when plural audio mapping functions are used simultaneously and result in simultaneous or otherwise overlapping sounds, that to facilitate audibly distinguishing audio signals, strategies similar to those discussed herein with respect to two-dimensional scrolling may be employed. For example, different instrument sounds may be used to further subdivide a frequency ranged used by each audio mapping function.

Figure 8:
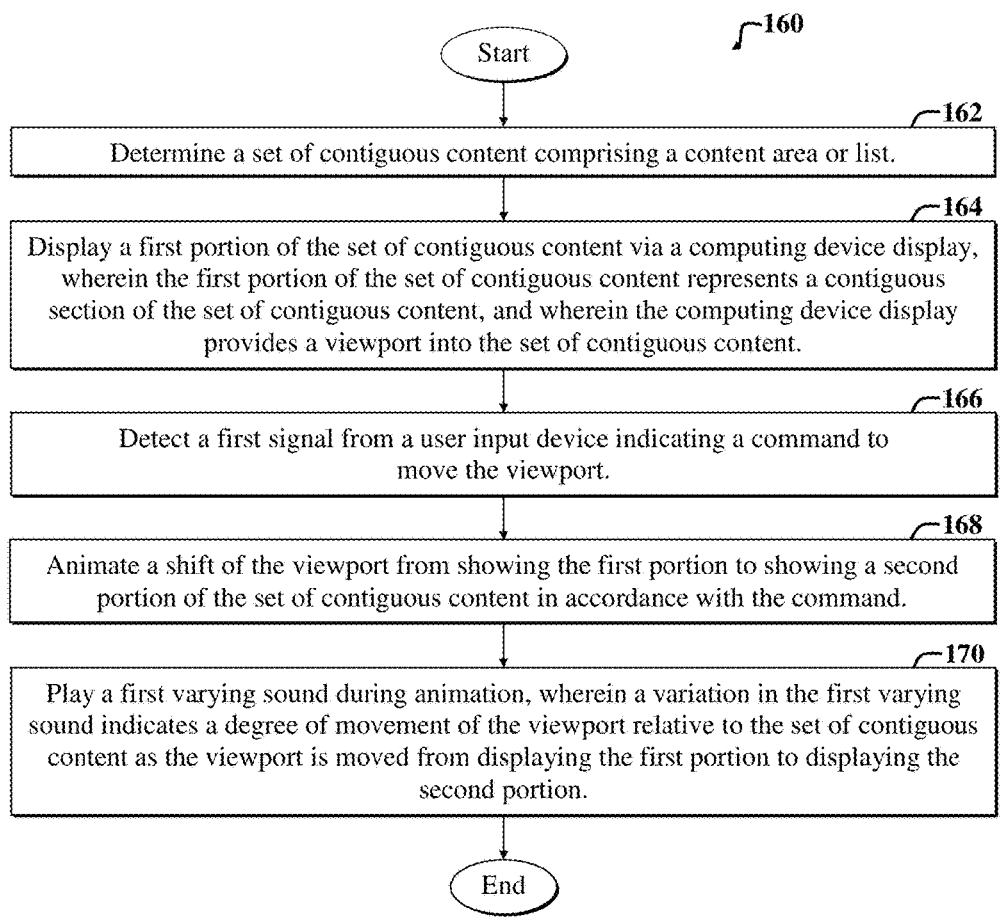
FIG. 8 is a flow diagram of a first example method suitable for use with the embodiments of FIGS. 1-7.

FIG. 8 is a flow diagram of a first example method 160 suitable for use with the embodiments of FIGS. 1-7. The first example method 160 facilitates conveying audio feedback characterizing scrolling of content in a UI display screen.

The first example method 160 includes a first content-determining step 162, which involves determining a set of contiguous content, e.g., comprising a content area. For the purposes of the present discussion, contiguous content may be any set of content arranged or to be arranged and displayed in one or more abutting sections or regions of a UI display screen comprising a viewport for viewing the contiguous content.

A subsequent displaying step 164 includes displaying a first portion of the set of contiguous content via a computing device display (e.g., the touchscreen display 12 of FIG. 1). The first portion of the set of contiguous content may represent a contiguous section of the set of contiguous content. For the purposes of the present discussion, a contiguous section of a set of contiguous content (i.e., content area) may represent a region of or length of a scrollable area. An example of a contiguous section corresponds to a section of a content area that is displayed within a particular viewport.

Next, a signal-detecting step 166 includes detecting a first signal from a user input device (e.g., mobile device an accompanying microphone), wherein the first signal indicates or comprises a command to move the viewport across the content area.

A fourth animating step 168 includes animating a shift of the viewport from showing the first portion to showing a second portion of the set of contiguous content in accordance with the command. Example frames of such an animation correspond to content regions 52, 72, 92 of FIGS. 2-4, respectively. The associated example scroll operation involves scrolling the content window 14 across the entire content area 50, from top to bottom.

Lastly, a fifth sound-varying step 170 includes, during animating, playing a first varying sound. A variation in the first varying sound indicates a degree of movement of the viewport relative to the set of contiguous content as the viewport is moved from displaying the first portion to displaying the second portion.

Note that the first example method 160 may be altered, without departing from the scope of the present teachings. For example, the first example method 160 may further specify determining the variation in accordance with a sound-to-position mapping that accounts for a distance between the first portion and second portion relative to the entire set of contiguous content. The relative distance (e.g., as may be indicated via a percentage or fraction) represent the degree of movement of a viewport position across a content area during a scroll operation.

The sound-to-position mapping may specify mapping of different sound qualities to different axis of the contiguous set of contiguous content. The contiguous set of contiguous content may include scrollable list content. The variation may indicate a number of list items that have been scrolled when transitioning the viewport from displaying the first portion of content to displaying the second portion of content after scrolling.

The contiguous content may include two-dimensional content. The example method 160 may further include using the first varying sound to indicate vertical movement of the viewport across the set of contiguous content, and using a second varying sound to indicate horizontal movement of the viewport across the set of contiguous content. The method 160 may further include playing a combination of the first varying sound and the second varying sound to indicate horizontal and vertical coordinates of the viewport relative to the set of contiguous content.

The contiguous content may include constituent boundaries (also called inner boundaries) between one or more sections thereof, and wherein the first varying sound includes a characteristic of sound that varies to indicate a relative position of content displayed in the viewport relative to the entire set of contiguous content. A second varying sound may be played to indicate transition of the viewport across a boundary of a section of the contiguous content during a scroll operation. In certain implementations, the command to move the viewport may include a zoom operation, such that the second portion represents a zoomed in section of the first portion.

The first example method 160 may further specify that the set of contiguous content includes a set of sectioned content, wherein each section within the sectioned content is adjacent to another section. The sectioned content may include a list of UI display screen items, and the command may represent a command to scroll the sectioned content. The variation in the sound a varying frequency that varies by continuously increasing in frequency or continuously decreasing in frequency as the sectioned content is scrolled.

An audio percussion may be played as a scroll position (e.g., viewport position) moves past each boundary of sectioned content. The audio percussion may represent the varying sound. The audio percussion varies in frequency as successive sections of the sectioned content appear in the viewport.

Alternatively, the audio percussion represents a second varying sound that is played in combination with the first varying sound. A characteristic of the percussion may be varied as each element of the sectioned content comes into the viewport. Varying of the characteristic may include, for example, varying a volume of the percussion; varying a frequency of the percussion; varying a treble or bass of the percussion, and so on.

The audio percussions may include musical notes. The played musical notes may successively increase or decrease in volume (or another property) as the sectioned content is scrolled, thereby playing a musical scale or portion thereof as the content is scrolled.

The sectioned content may include map data or other data displayable in two or more dimensions. The first portion and section portion of the sectioned content may include, for example, different geographical regions of a map illustrating the map data.

Accordingly, the set of contiguous content may include an electronic map. The first portion of the set of contiguous content may represent a first region of the map. Similarly, the second portion may represent a second region of the map that is displayed after scrolling or panning the map in accordance with the command.

The third example method 160 may further specify that the fourth animating step 168 further includes calculating a movement across the set of contiguous content based on different positions of the first portion and second portion relative to the set of contiguous content; and varying the sound in accordance with the movement.

Figure 9:
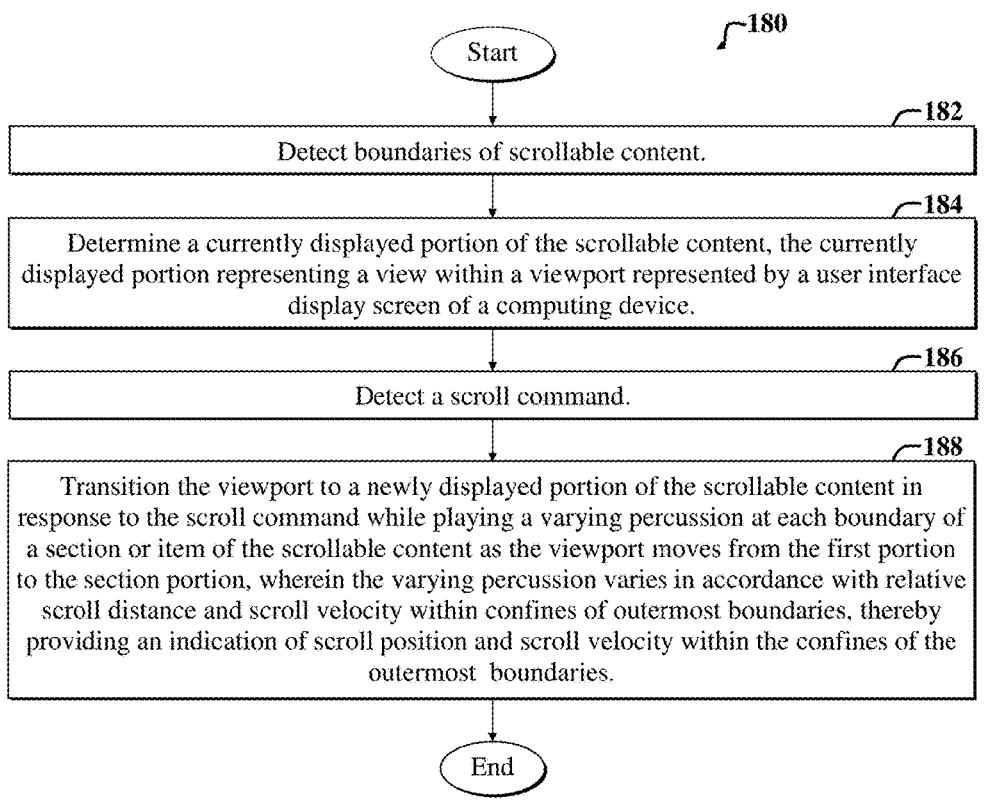
FIG. 9 is a flow diagram of a second example method suitable for use with the embodiments of FIGS. 1-8.

FIG. 9 is a flow diagram of a second example method 180 suitable for use with the embodiments of FIGS. 1-8. The second example method 180 facilitates providing audio feedback to a user during software interaction, and includes an initial content boundary-detecting step 182.

The content boundary-detecting step 182 involves detecting boundaries (e.g., upper and lower vertical scroll boundaries; left and right horizontal scroll boundaries) of scrollable content, e.g., boundaries of a content area.

A second position-determining step 184 includes determining a currently displayed portion of the scrollable content (also called displayed content area portion). The currently displayed portion may represent or correspond to a view within a viewport represented by a user interface display screen of a computing device.

A third scroll-detecting step 186 includes detecting a scroll command, e.g., as indicated via control signal from the device software 16 of FIG. 1 and intercepted by the scroll detection module 24 of FIG. 1.

A fourth viewport-transitioning step 188 includes transitioning the viewport to a newly displayed portion of the scrollable content in response to the scroll command while playing a varying percussion at each boundary of a section or item of the scrollable content as the viewport moves from the first portion to the section portion. The varying percussion may vary in accordance with relative scroll distance and scroll velocity within confines of outermost boundaries of the boundaries of scrollable content, thereby providing an indication of scroll position and scroll velocity within the confines of the boundaries.

Note that the second example method 180 may be modified, without departing from the scope of the present teachings. For example, the method 180 may further specify that the section of the scrollable content includes or represents a list item. In such case, boundaries of the scrollable content may include a top and a bottom of a list of items, where the list of items represents the scrollable content (e.g., corresponding to a one-dimensional content area).

Alternatively, the second example method 180 may further specify that the scrollable content includes two-dimensional content, such as content representing a geographical region of a map. Accordingly, boundaries of the scrollable content include one or more sides of two-dimensional scrollable content, e.g., data corresponding to a map or map region.

The second example method may further specify that the fourth transitioning step 188 further includes playing a continuously varying sound that varies as the scrollable content is scrolled in response to the scroll command to indicate a continuous scroll operation. The continuously varying sound may be varied by changing a property of the sound in accordance with a sound-to-position mapping that maps indications of scroll distance and scroll velocity to a sound function.

The sound function may specify or include a proportionally increasing frequency in a horizontal scroll direction in a proportion characterized by ratio of a scroll distance to a distance between opposite boundaries of the scrollable content in-line with the scroll direction. The sound function may include a proportionally increasing frequency in a vertical scroll direction in proportion of a ratio of a scroll distance to a distance between opposite boundaries of the scrollable content in-line with the scroll direction.

The second example method 180 may further include varying a first property of sound associated with a vertical axis of the scrollable content to indicate vertical movement of the viewport across the scrollable content, and varying a second property of sound associated with a horizontal axis of the scrollable content to indicate horizontal movement of the viewport across the scrollable content.

Figure 10:
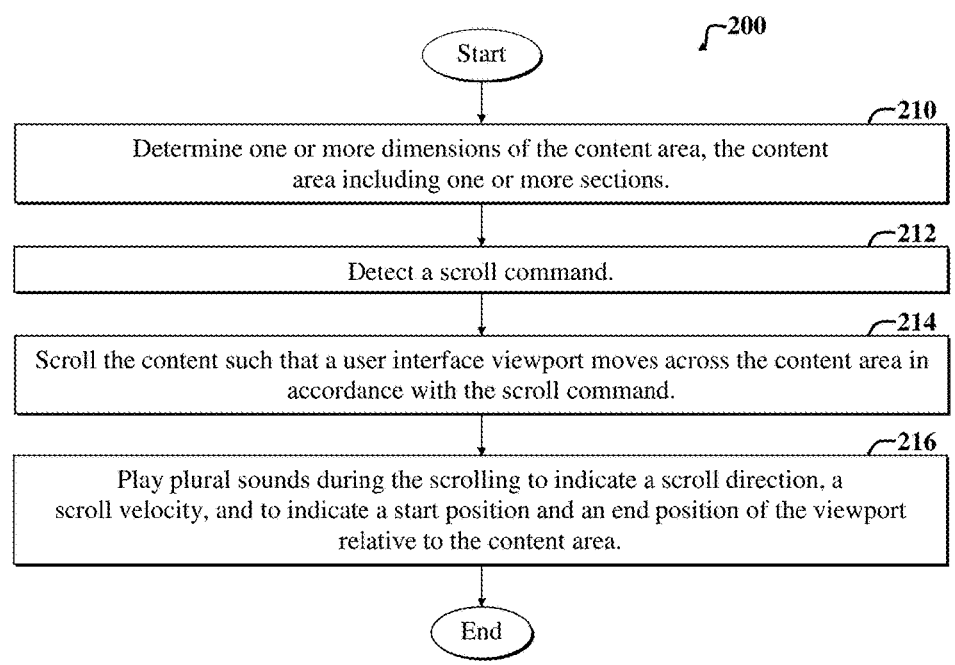
FIG. 10 is a flow diagram of a third example method suitable for use with the embodiments of FIGS. 1-9.

FIG. 10 is a flow diagram of a third example method 200 suitable for use with the embodiments of FIGS. 1-9. The third example method uses multiple sounds or variations in sound properties to facilitate providing audio feedback when scrolling or panning content to reveal new content of a content area illustratable via a computing device display.

The third example method 200 includes a first step 210, which involves determining one or more dimensions of the content area, wherein the content area includes one or more sections.

A second step 212 includes detecting a scroll command. The second step 212 may be implemented similarly as the third scroll-detecting step 186 of FIG. 9.

A fourth step 216 includes playing plural sounds during the scrolling to indicate a scroll direction, a scroll velocity, and to indicate a start position and an end position of the viewport relative to the content area.

Note that the third example method 200 may be modified, without departing from the scope of the present teachings. For example, the third example method 200 may further include detecting one or more scroll operations responsive to plural scroll commands; and receiving a signal from an input device to effectuate a playback of a history of the plural sounds. The plural scroll commands may represent a scroll history for a particular user software-interaction session, e.g., a particular login-session. The playback of the history of the plural sounds represents a playback of an audio history indicative of a scroll history that includes the plural scroll commands.

The third example method 200 may further specify that the fourth step 216, pertaining to the playing of plural sounds, includes playing the plural sounds such that one or more properties of the plural sounds change(s) during scrolling to indicate a number of scrolled content sections. Playing plural sounds may further include using a sound-to-position mapping that maps a position of the viewport relative to the content area, wherein the content area is represented by a body of scrollable content.

Playing plural sounds may further include selectively playing a first sound during scrolling in a first direction; and varying a first property of the first sound as the first sound is played to indicate a scroll direction. The first property may include frequency, and the first sound may include a musical note. The third example method 200 may further specify playing the first sound at one or more boundaries of the one or more sections as the one or more sections are scrolled into or out of the viewport, wherein the first sound includes a percussion.

The forth step 216 pertaining to the playing of plural sounds may further include selectively playing a second sound in addition to the first sound during scrolling. The first sound may include or represent a tone that with a continuously increasing or decreasing tone in a given scroll direction. The second sound may include a percussion that is played when one or more boundaries of one or more sections transition across a boundary of the viewport used to view the content area.

The third example method 200 may further include continuously varying a frequency of the continuously increasing or decreasing tone when a boundary of the viewport is within the one or more sections. The second sound may be played when scrolling in a second direction. The second direction may include a horizontal direction, while the first direction may include a vertical direction.

The third example method 200 may further include selectively playing a combination of the first sound and the second sound when scrolling diagonally across the content area, wherein the content area is characterized by multiple dimensions, i.e., represents a multi-dimensional content area. The multiple dimensions may horizontal and vertical dimensions.

A third sound may be played when scrolling in a third direction along an axis corresponding to a third dimension of the scrollable content, thereby indicating a current zoom level as the content area is zoomed. The first sound may be confined to within a first audio frequency range, while the second sound is confined to within a second audio frequency range. The third example method 200 may further include varying a first property of the first sound to indicate a first scroll direction and scroll velocity; and varying a second property of the second sound to indicate a second scroll direction and scroll velocity. The first sound may include or represent a musical instrument sound, while the first property includes a musical note of the musical instrument.

Although the description has been described with respect to particular embodiments thereof, these particular embodiments are merely illustrative, and not restrictive. For example, while various embodiments discuss varying a frequency of a sound to indicate relative scroll position, direction, and velocity of a viewport relative to a content area, embodiments are not limited thereto. For example, other properties, such as volume, bass, treble, sustain, attack, and so on can be varied to indicate relative scroll position, velocity, direction, and so on, of a viewport relative to boundaries of a content area.

Furthermore, while various embodiments discuss scrolling, panning, and/or zooming of one-dimensional content and/or two-dimensional content areas, embodiments are not limited thereto. For example, navigation of a viewport or cursor relative to three-dimensional content, e.g., a rotatable visualization, can also be mapped to sounds and/or sound properties in accordance with embodiments discussed herein. For example, content rotation direction and angular velocity can be indicated via varying audio frequencies and/or other sound properties, without departing from the scope of the present teachings.

In addition, while certain embodiments discuss using swipe gestures applied mobile device touch screens to effectuate content scrolling, embodiments are not limited thereto. For example, a computer mouse and a scroll bar or position slider may be used to facilitate scrolling or panning.

Furthermore, while various embodiments are discussed with respect to scrolling of content along a particular vertical and/or horizontal axis, embodiments are not limited thereto. Scrolling may also occur along a depth axis or z-axis, such that scrolling along the z-axis results in zooming in or out. Scrolling along a z-axis may be implemented via a zoom slider, where the position of the zoom slider bar along a zoom slider is mapped to a particular sound, sound type, and/or sound property.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing audio feedback when scrolling or panning an object in a content area simultaneously in two dimensions on a computing device display, the method comprising:
    determining a first dimension the content area, the content area including one or more sections;
    determining a second dimension of the content area;
    associating a first sound with the first dimension; associating a second sound with the second dimension;
    detecting a scroll command indicating that the object is moving across the content area by traversing both the first and second dimensions simultaneously;
    playing the first sound at a first pitch corresponding to a position of the object along the first dimension while simultaneously playing the second sound at a second pitch corresponding to a position of the object along the second dimension; and
    receiving a signal from an input device to cause a playback of an audio history indicative of a scroll history that includes the scroll commands.

2. The method of claim 1, further including:
    playing plural sounds to indicate one or more of a scroll direction, a scroll velocity, a start position, an end position, such that one or more properties of the plural sounds change during scrolling to indicate a number of scrolled content sections.

3. The method of claim 2, wherein playing plural sounds further includes using a sound-to-position mapping that maps a position of the viewport relative to the content area, the content area representing a body of scrollable content.

4. The method of claim 3, wherein playing plural sounds further includes:
    selectively playing a first sound during scrolling in a first direction; and
    varying a first property of the first sound as the first sound is played to indicate a scroll direction.

5. The method of claim 4, wherein the first property includes frequency.

6. The method of claim 4, wherein the first sound includes a musical note.

7. The method of claim 6, further including playing the first sound at one or more boundaries of the one or more sections as the one or more sections are scrolled into or out of the viewport, wherein the first sound includes a percussion.

8. The method of claim 4, wherein playing plural sounds further includes:
selectively playing a second sound during scrolling.

9. The method of claim 8, wherein the first sound includes a continuous tone that continuously increases or decreases in frequency, and wherein the second sound includes a percussion played when one or more boundaries of one or more sections transition across a boundary or boundaries of the viewport used to view the content area.

10. The method of claim 8, further including continuously varying a frequency of a continuously increasing or decreasing tone when a boundary of the viewport is within the one or more sections.

11. The method of claim 8, further including playing the second sound when scrolling in a second direction, wherein the second direction includes a horizontal direction, and wherein the first direction includes a vertical direction.

12. The method of claim 11, further including selectively playing a combination of the first sound and the second sound when scrolling diagonally across the content area, the content area characterized by multiple dimensions.

13. The method of claim 12, wherein the multiple dimensions include horizontal and vertical dimensions.

14. The method of claim 12, further including playing a third sound when scrolling in a third direction along an axis corresponding to a third dimension of the scrollable content, thereby indicating a current zoom level as the content area is zoomed.

15. The method of claim 8, wherein the first sound is confined to within a first audio frequency range, and wherein the second sound is confined to within a second audio frequency range.

16. The method of claim 8, further including:
varying a first property of the first sound to indicate a first scroll direction and scroll velocity; and
varying a second property of the second sound to indicate a second scroll direction and scroll velocity.

17. The method of claim 16, wherein the first sound includes a musical instrument sound, and wherein the first property includes a musical note of the musical instrument.

18. An apparatus for providing audio feedback when scrolling or panning an object in a content area simultaneously in two dimensions on a computing device display, the apparatus comprising:
one or more processors;
a tangible processor-readable storage device including instructions for:
determining a first dimension the content area, the content area including one or more sections;
determining a second dimension of the content area;
associating a first sound with the first dimension;
associating a second sound with the second dimension;
detecting a scroll command indicating that an object is moving across the content area by traversing both the first and second dimensions simultaneously;
playing the first sound at a first pitch corresponding to a position of the object along the first dimension while simultaneously playing the second sound at a second pitch corresponding to a position of the object along the second dimension; and
receiving a signal from an input device to cause a playback of an audio history indicative of a scroll history that includes the scroll commands.

19. A tangible processor-readable storage device including instructions executable by one or more processors for providing audio feedback when scrolling or panning an object in a content area simultaneously in two dimensions on a computing device display, the instructions when executed causing the following acts:
determining a first dimension the content area, the content area including one or more sections;
determining a second dimension of the content area;
associating a first sound with the first dimension;
associating a second sound with the second dimension;
detecting a scroll command indicating that an object is moving across the content area by traversing both the first and second dimensions simultaneously;
playing the first sound at a first pitch corresponding to a position of the object along the first dimension while simultaneously playing the second sound at a second pitch corresponding to a position of the object along the second dimension; and
receiving a signal from an input device to cause a playback of an audio history indicative of a scroll history that includes the scroll commands.

* * * * *

UNITED STATES PATENT AND TRADEMARK OFFICE
CERTIFICATE OF CORRECTION

PATENT NO. : 10,175,941 B2
APPLICATION NO. : 15/163638
DATED : January 8, 2019
INVENTOR(S) : Molesky et al.

Page 1 of 1

It is certified that error appears in the above-identified patent and that said Letters Patent is hereby corrected as shown below:

In the Specification

In Column 1, Line 18, delete "Use" and insert -- User --, therefor.

In Column 14, Line 6, delete "2-2" and insert -- 2-5 --, therefor.

In Column 15, Line 62, delete "provides provide" and insert -- provides --, therefor.

In the Claims

In Column 22, Line 30, in Claim 1, delete "dimension" and insert -- dimension of --, therefor.

In Column 24, Line 8, in Claim 18, delete "dimension" and insert -- dimension of --, therefor.

In Column 24, Line 28, in Claim 19, delete "dimension" and insert -- dimension of --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*